United States Patent
Kelsey

Patent Number: 5,907,142
Date of Patent: May 25, 1999

[54] FRAUD RESISTANT PERSONALLY ACTIVATED TRANSACTION CARD

[76] Inventor: Craig E. Kelsey, 400 S. Lafayette, #902, Denver, Colo. 80209

[21] Appl. No.: 08/655,428

[22] Filed: May 28, 1996

Related U.S. Application Data

[63] Continuation-in-part of application No. 08/570,757, Dec. 12, 1995, abandoned.

[51] Int. Cl.⁶ ..................................................... G06K 5/10
[52] U.S. Cl. ............................................................ 235/380
[58] Field of Search ............................................. 235/380

[56] References Cited

U.S. PATENT DOCUMENTS

| | | | |
|---|---|---|---|
| 4,614,861 | 9/1986 | Pavlov et al. | 235/380 |
| 4,692,601 | 9/1987 | Nakano | 235/380 |
| 4,697,072 | 9/1987 | Kawana | 235/380 |
| 4,868,376 | 9/1989 | Lessin et al. | 235/380 |
| 4,879,455 | 11/1989 | Butterworth et al. | 235/380 |
| 5,180,902 | 1/1993 | Schick et al. | 235/380 |

*Primary Examiner*—David P. Porta
*Assistant Examiner*—Douglas X. Rodriguez
*Attorney, Agent, or Firm*—Douglass F. Vincent

[57] ABSTRACT

A method and apparatus for preventing transaction card fraud. A transaction card has a keypad display, and a microprocessor for receiving and processing numbers and symbols entered through the keypad. A transaction access code and a corresponding transaction approval code are provided by the card issuer to the seller at the time of a transaction. The cardholder entering the transaction access code into the keypad of the card causes an authentically used card to display a symbol identical to the transaction approval code provided by the issuer. Comparison of the symbol and the transaction approval code can thus be used to authenticate a card transaction. The access code and corresponding approval code are changed by the issuer after each transaction to further aid in fraud prevention.

1 Claim, 4 Drawing Sheets

FRAUD RESISTANT PERSONALLY ACTIVATED TRANSACTION CARD

This application is a continuation-in-part of U.S. patent application Ser. No. 08/570,757, filed Dec. 12, 1995, now abandoned and entitled "FRAUD RESISTANT PERSONALLY ACTIVATED TRANSACTION CARD."

TECHNICAL FIELD

This invention relates to fraud resistant transaction cards, and specifically to an improved security mechanism self-contained within charge and debit cards.

BACKGROUND ART

Banks and retailers commonly supply consumers with transaction cards, including charge cards and debit cards, in order to provide a system for non-cash transactions. Originally these cards contained an embossed card account number on the front, and an area for a card holder signature on the back. These early cards provided a means for retailers to record the embossed card number by use of an imprinter at the point of sale. As banks began issuing credit cards to individuals, credit limits were set. This added a new step at the point of sale, wherein the sales clerk would call the issuing bank to verify that the consumer had sufficient credit to make the purchase at hand. This protected the retailer and the bank against individual card holders who had no available credit. However, it did not ensure that the individual who presented the card was the rightful cardholder.

To prevent fraudulent use of a card by a non-cardholder, a sales clerk would additionally compare the signature on the back of the transaction card against the signature on the transaction receipt. Often times a second form of identification such as a driver's license was required. Comparison of signatures and requiring second identification are ineffective against fraudulent use because they are subjective comparisons and forgery is commonplace. The signature comparison and telephone verification do very little to deter fraudulent use, and in addition cause unacceptable delays at the point-of-sale. In response to these delays magnetic stripe technology was introduced to credit cards. Point-of-sale magnetic stripe card readers accomplished what a phone call did previously, and in a much shorter period of time. Over time less focus on authorized use developed because of the need for more rapid processing at point-of-sale. In fact, speed of transaction has become more important than unauthorized use.

In general, transaction cards and card reader systems have evolved in response to needed efficiency at point-of-sale. Authorized use of transaction cards has always been important to both the issuer and the cardholder, but verifying authorized use has always been time-consuming and has often caused delays at point-of-sale. Comparison of cardholder signature is the predominant method of verification, along with a request for a second form of identification. Cardholder photographs affixed to the front of the cards have also been added as a measure of security. Methods for added security and speed of transaction at point-of-sale have always been mutually exclusive. The more scrutiny at point-of-sale, the slower the transaction. Issuing banks want cardholders to use their cards. Retailers want to offer transaction cards as an option of payment but do not want to delay customers any longer than necessary. Cost goes up for the retailers and customer satisfaction goes down as a result of delays. Numerous patents have been filed in recent years to address this problem but all are inadequate in one sense or another. The cost of fraud is thus accepted by the issuers and often times passed along to the cardholders in the form of higher interest rates.

There thus exists a delicate balance between consumers, retailers, banks, and credit card associations in regard to security, speed at point-of-sale, and cost of transaction card systems. Previous fraud-prevention measures, relating to enhanced security innovations for transaction cards which did not take into consideration existing magnetic stripe technology, the size of existing transaction cards, and existing credit/debit card reading systems are not commercially viable.

The following U.S. Patents relate to security measures designed to prevent transaction card fraud.

| U.S. Pat. No. | Issued | Inventors |
| --- | --- | --- |
| 4,701,601 | Oct. 20, 1987 | Francini, et al. |
| 4,795,898 | Jan. 3, 1989 | Bernstein, et al. |
| 5,255,941 | Oct. 26, 1993 | Solomon |
| 5,269,649 | Nov. 9, 1993 | Shomron |
| 5,276,311 | Jan. 4, 1994 | Hennige |
| 5,412,192 | May 2, 1995 | Hoss |

Francini '601 is a transaction card which contains a numeric keypad and a magnetic stripe emulator. This card differs from the usual configuration of present transaction cards by not having embossed numbers for use in card imprinter systems. It also introduces a complex emulator which may not work with existing card reader systems and may be expensive to produce. This card does not contain a periodically changing pre-selected identifying symbol which corresponds to the card issuer's database.

Bornstein '898 is a personal memory card which does not contain a numeric keypad or its own source of internal power. It cannot be personally activated at the point-of-sale, and requires a new card reader system which does not use the current standard magnetic stripe technology. The card technology of Bornstein would thus require a complete change from the current standard technology, which would be very disruptive and expensive.

Shomron '649 is an antifraud transaction card which offers some advantages, but which has the disadvantage of requiring the cardholder to remember a great deal of information in order to use the card.

Hennige '311 is an antifraud and programmable transaction card which can store information regarding numerous transaction card accounts on one card, and has the capability of pulling up the cardholder's signature for verification. This invention is costly and requires a total change of card reading systems, since it does not utilize magnetic stripe technology. Further, the process by which this invention is used at point-of-sale still relies on subjective comparison of signatures.

Hoss '192 is a radio frequency (R.F.) activated charge card which can be altered by an R.F. signal transmitted by the card issuer intended to change the status of the card. This feature has some value, but the antifraud characteristics of the card will do little to deter fraudulent use by an unauthorized user.

It is the primary objective of the present invention to provide a new and improved transaction card capable of greatly deterring unauthorized use, while eliminating subjectivity at point-of-sale, thus reducing transaction time. In addition, this invention interfaces with current card reader and hardware systems, eliminating the need for large investment in new hardware systems. Further objects and advantages will become apparent from a consideration of the drawings and ensuing description.

DISCLOSURE OF THE INVENTION

In accordance with this invention a fraud resistant personally activated transaction card includes a transaction card including on its front side a ten-digit key pad, an enter key, a cancel key, a solar cell, and a display light. Also on the front of the card are standard embossed card numbers and cardholder name. There may also be contained within the card a lithium strip or thin battery capable of providing sufficient energy to power the cards' transactions when a source of light is not available. While this transaction card may be used with conventional card readers, the card is also characterized by its ability to be personally activated by the cardholder entering a card activation number. This card activation number is similar to the well known personal identification number or "PIN," in the sense that the number is known only to the card holder. However, unlike the PIN, the card activation number actually serves to activate an electrical microprocessor within the card when entered into the card through the keyboard on the face of the card. In the present invention, for example, the card activation number operates an internal microprocessor circuit which turns on a display light on the face of the card. In this way, an illuminated display light ensures that the true cardholder is presenting the card for use. In this regard, it is preferable that the card activation number be selected by the cardholder by telephone for encoding the number directly into a secure database. By entering the number directly into the secure database in this manner, no written "hard copy" record of the number will exist, thereby further improving the security of the system.

The second embodiment includes the same characteristics of the first, except that the light is replaced with a liquid crystal display capable not only of showing that the card is activated but also of displaying a unique symbol (letter or number) which is preprogrammed internal microprocessor and which changes periodically according to a pre-programmed schedule. An identical set of pre-programmed periodically changing symbols is maintained in a database by the card issuer or its agent. The symbol from the issuer's database is compared by the retailer to the symbol displayed on the card at the point-of-sale, or to the symbol relayed to the retailer by the purchaser over the telephone in a telephone transaction. This added security step over the first embodiment further serves to prevent the presentation of a fraudulently manufactured card. That is, while the activation of the card by the entering of the card activation number generally indicates an authorized cardholder, there remains the possibility that the card could have been fraudulently manufactured to be activated by a fraudulent user. To prevent this type of fraud, the activated card displays a symbol to be matched against a secure database. The verification process thus has two steps. First, the card will not be accepted at all unless a symbol is displayed. Second, matching symbols then indicate that the purchaser has activated the card and that the card itself is authentic. This authentication procedure greatly enhances protection against unauthorized card use and also helps to eliminate the possibility of fraudulently manufactured cards, which could be rigged to display a symbol.

The third embodiment of the invention contains the same characteristics of either the first or second embodiment of the present invention but in addition, contains an electrical microprocessor capable of activating an internal transducer positioned over the magnetic stripe which is capable of altering or activating the magnetic stripe. The embodiment provides additional security against fraudulent use and also adds the capability of programming a number of cards or accounts onto one card.

In view of the foregoing, several advantages of the present invention are readily apparent. A fraud resistant transaction card is provided which provides added security against fraudulent use by an unauthorized user. The card is easily operated by the user, and additionally requires no new equipment for its operation. Further, verification procedure used with the card is quick and easy to perform.

Additional advantages of this invention will become apparent from the description which follows, taken in conjunction with the accompanying drawings.

BRIEF DESCRIPTION OF THE DRAWINGS

FIG. 3b is a sectional view taken along line 3b—3b of FIG. 3a;

FIG. 4b is a sectional view taken along line 4b—4b of FIG. 4a;

FIG. 5b is a sectional view taken along line 5b—5b of FIG. 5a.

REFERENCE NUMERALS IN DRAWINGS

12. Transaction card
14. Thin Battery
16. Solar Cell
18. Power Regulator
20. Timer 22. Numeric Key Pad
24. Electrical Microprocessor
26. Enter Key
28. Cancel Key
30. Display Light
32. Magnetic Stripe
34. Liquid Crystal Display
36. Transducer
38. Ferrite Core
40. Coil
44. Identifying Code

BEST MODE FOR CARRYING OUT THE INVENTION

Figure 1:
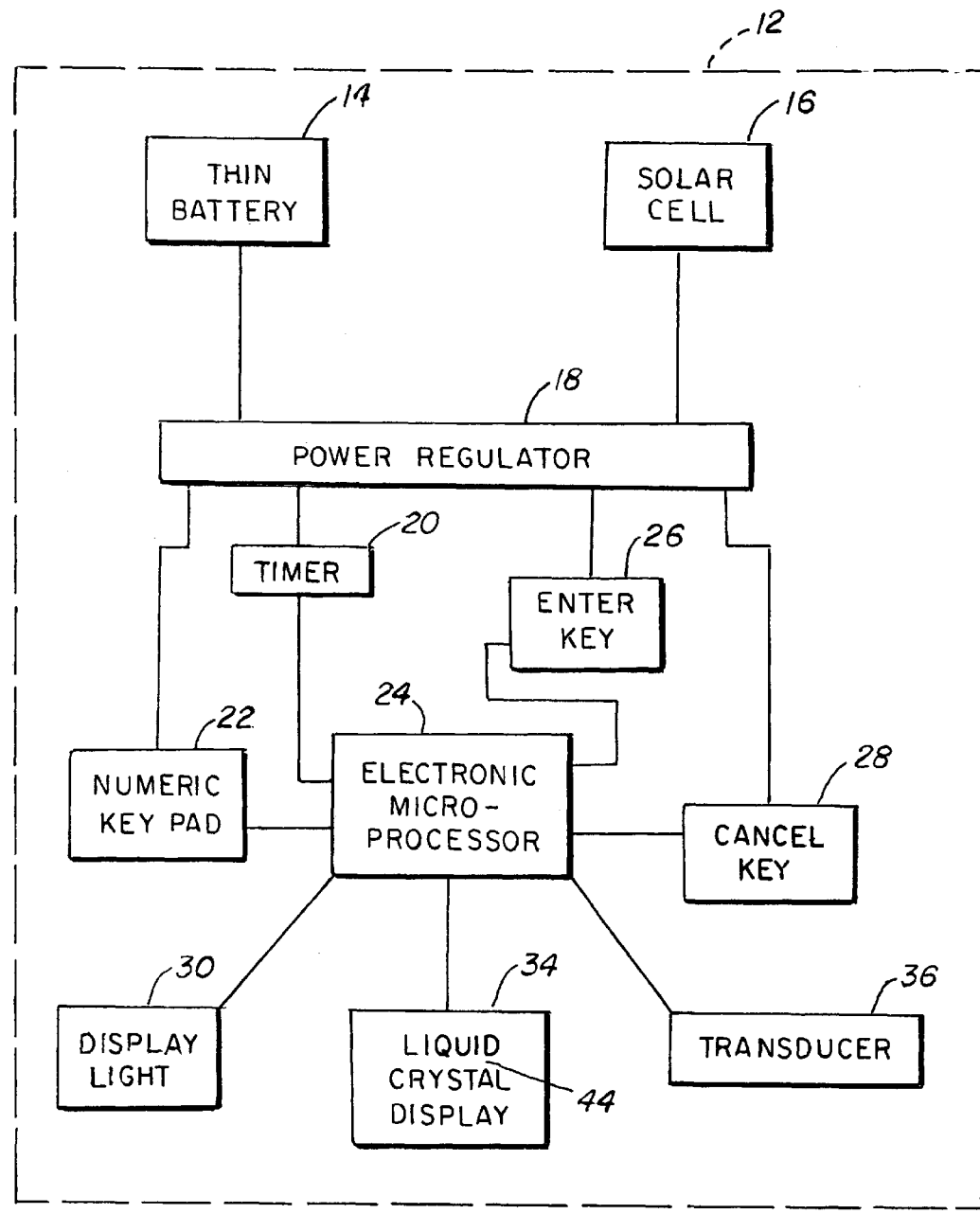
FIG. 1 is a block diagram of the components of the personally activated transaction card of the present invention.
Figure 2:
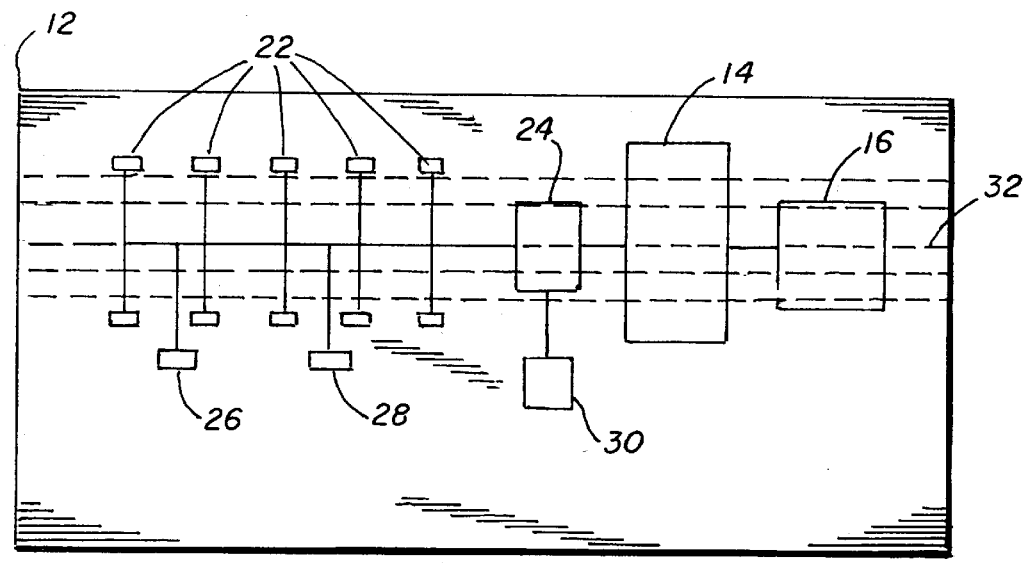
FIG. 2 is a schematic illustrating the block circuitry depicted in FIG. 1.

Referring now to the drawings, FIG. 1 represents the functional circuit components of a standard size transaction card of the present invention. A transaction card 12 is provided with an optional solar cell 16 and a thin battery 14 power source which extends power to an enter key 26, a numeric keypad 22, a cancel key 28, and an electrical microprocessor 24. Optional power regulator 18 may be provided between the components and the power sources 14,16. After enter key 26 is pressed, microprocessor 24 is ready to receive card activation number from numeric keypad 22. After a card activation number is entered by pressing the correct sequence on numeric keypad 22, the microprocessor 24 receives the number and activates a display light 30. A retailer or other party accepting the card may then note that the display light has been lit, indicating that the correct card activation number has been used. This helps to verify that the person using the card is the rightful cardholder. Upon completion of point-of-sale transaction, the cardholder deactivates the display light 30 by pressing the cancel key 28. Optionally, to prevent accidental de-activation, the cardholder may be required to de-activate the card by pressing the card activation number in the correct sequence on the numeric keypad 22, after pressing the cancel key 28. Also contained within microprocessor 24 is an optional timer which automatically deactivates the transaction card 12 after a specified period of time. This will protect the cardholder in the case that the cardholder forgets to press the cancel key 28. Power for the credit or debit card 12 is supplied by a thin battery 14 and a solar cell 16. Solar cell 16 provides a direct source of power and additionally recharges the thin battery 14. Magnetic stripe 32 as commonly used in credit and debit cards stores information which can be read by point-of-sale card readers, automatic tellers and the like.

Figure 3A:
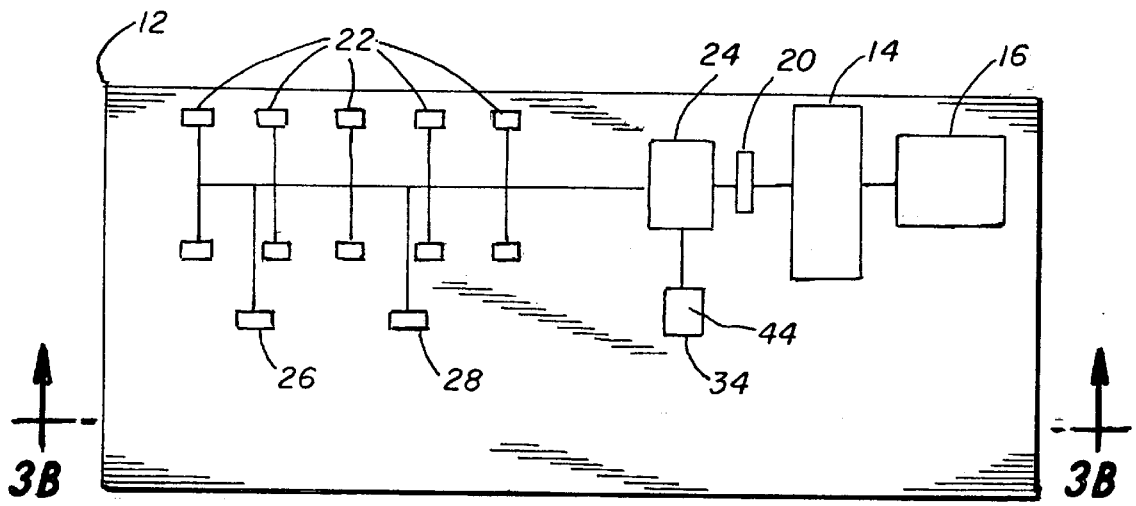
FIG. 3a is a schematic illustration of an embodiment of the present invention in which a symbol can be displayed on a liquid crystal display.
Figure 3B:
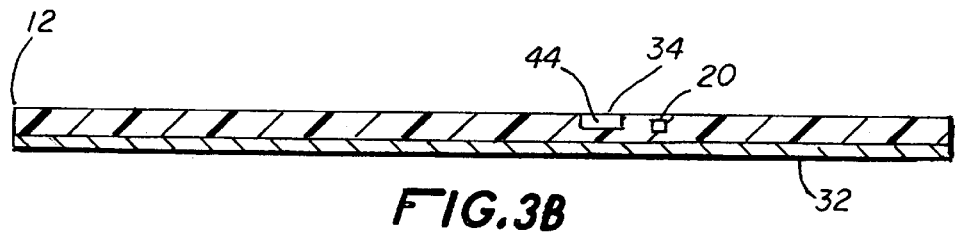

Another embodiment of the present invention is schematically illustrated in FIG. 3a and cross-sectionally in FIG. 3b. In this form the invention contains, in place of display light 30, a liquid crystal display 34. In addition, a timer 20 is placed between and connected to both thin battery 14, solar cell 16, and microprocessor 24. In this embodiment the invention is again activated by pressing enter key 26, then the correct card activation number on numeric keypad 22, which information is received by microprocessor 24. But, instead of activating display light 30 as in the earlier embodiment, microprocessor 24 activates liquid crystal display 34.

Electrical microprocessor 24 has been previously programmed by the card issuer at the time of manufacture of the transaction card 12. Microprocessor 24 has been programmed to provide liquid crystal display 34 with a symbol 44, preferably a letter or number or combinations thereof, which changes periodically during the scheduled lifetime of the transaction card 12, and is controlled by timer 20. The same preprogrammed sequence held in microprocessor 24 will be stored in the card issuer's database.

This embodiment provides three additional measures of security. The first is provided at in person point-of-sale. After transaction card 12 is activated by the cardholder and the symbol 44 is recognizable on liquid crystal display 34, the sales clerk passes the activated transaction card 12 through an existing card reading system. At this point, information regarding the card is provided from the card issuer to the point-of-sale in much the same fashion as is currently common. However, with the present invention, in addition to cardholder account and name information the sales clerk is provided with the sequential symbol held on the card issuer's database. A very rapid comparison can then be made against the symbol 44 which is visible on liquid crystal display 34 of transaction card 12. If the symbol 44 does not match the corresponding symbol provided from the issuer's database, then the possibility of a fraudulent card is indicated to the retailer.

A second method of security and a very important one is this embodiment's usefulness for telephone orders utilizing transaction card 12. Presently, a telephone salesclerk will request that the cardholder verbally provide their card account number over the phone. The telephone sales clerk then manually enters that number into their computer and the card issuer provides account information to the clerk. With the present embodiment the sales clerk would again be provided with the proper sequential symbol held on the card issuer's database. Meanwhile, the cardholder can activate their transaction card 12, and provide verbally to the telephone salesclerk the symbol 44 displayed on liquid crystal display 34. The telephone clerk can then instantly compare the two symbols and approve or disapprove the sale.

The third measure of security of this embodiment of this present invention is the added safety against illegal manufacture of transaction cards. The first embodiment whereby display light 30 verifies activation at point-of-sale would be much easier to manufacture by counterfeiters than the second embodiment which provides a symbol to be matched against a symbol from a secure pre-programmed database.

It should be noted that while a keypad in combination with a card in the preferred embodiment activation number is the preferred way to activate the transaction card, other approaches to activating the card are also available. For example, the technology exists whereby the card could be programmed to recognize the rightful cardholder's voice, with or without a preselected code word or words. When activated in this way, the card would again display a symbol for matching with a secure database maintained by the issuer or its agent. In similar fashion, the card could be activated by viewing the cardholder's fingerprint, again resulting in the display being activated.

Figure 4A:
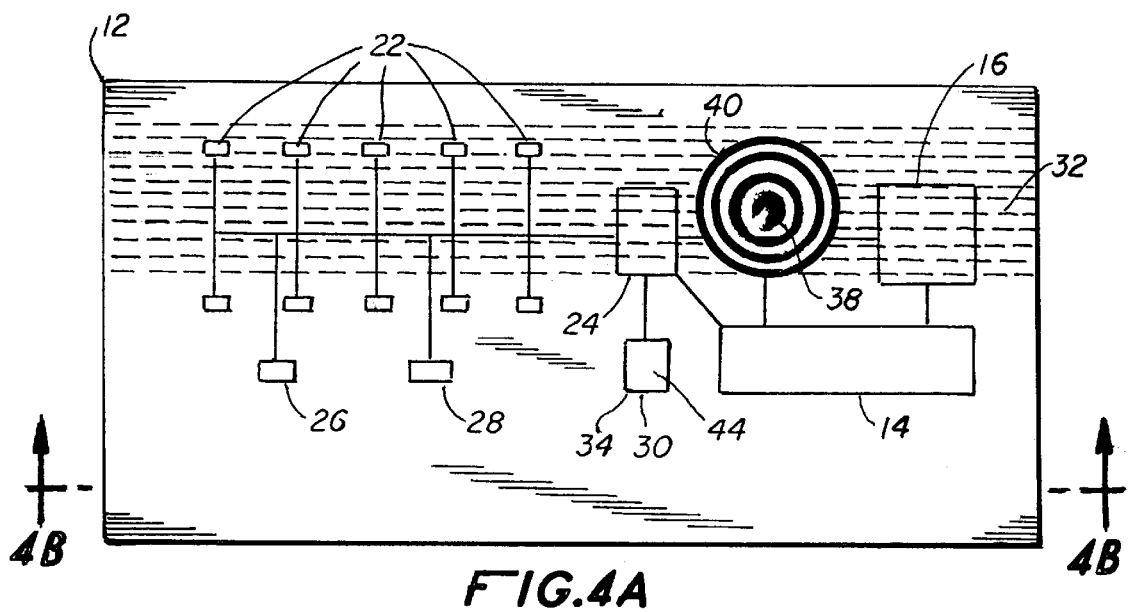
FIG. 4a is a schematic illustration of an embodiment of the present invention in which an electromagnetic field is created over a portion of the magnetic stripe to activate or alter the information provided therein.
Figure 4B:
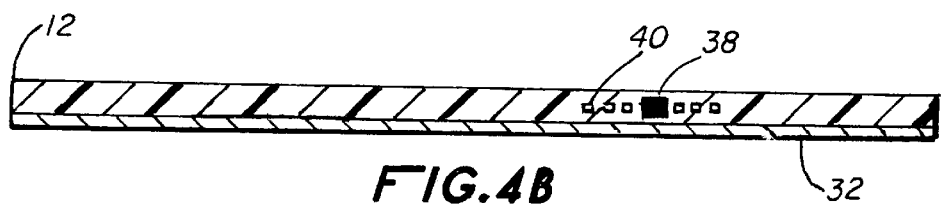

The third embodiment of the present invention provides for either of the elements of the first two embodiments, but in addition provides for an interface between microprocessor 24, and magnetic stripe 32. As with the previously mentioned embodiments of this present invention, this embodiment of transaction card 12 is activated by recognition of card activation number by microprocessor 24, from numeric keypad 22. In addition to activating either display light 30, or liquid crystal display 34, this embodiment activates a transducer 36. The transducer 36 of FIG. 1, FIG. 4a, and FIG. 4b, contains a magnetic coil 40 surrounding a ferrite core 38 within the laminate card, and is located over the magnetic stripe 32. The transducer when activated can focus a magnetic field over a portion of magnetic stripe 32, thus activating the card to be read by existing card reading systems. The interface between microprocessor 24 and magnetic stripe 32 in this embodiment of the present invention provides added security against illegal manufacture of credit or debit cards, and also creates the possibility of enhanced commercial use. On a credit or data card 12 of this type, numerous card account information could be contained on one magnetic stripe 32 that could be programmed at one central location. The same card activation number programming system and process could be used to program the card which was discussed in the above mentioned embodiments. With the addition of a card selection key or entry procedure, a card holder could access any one of the accounts held on the magnetic stripe 32 with one card activation number. Transducer 36 could then activate a specified region of the magnetic stripe 32 which contains the relevant account information. This would reduce the number of credit or debit cards individual cardholders would need to possess or carry.

Figure 5A:
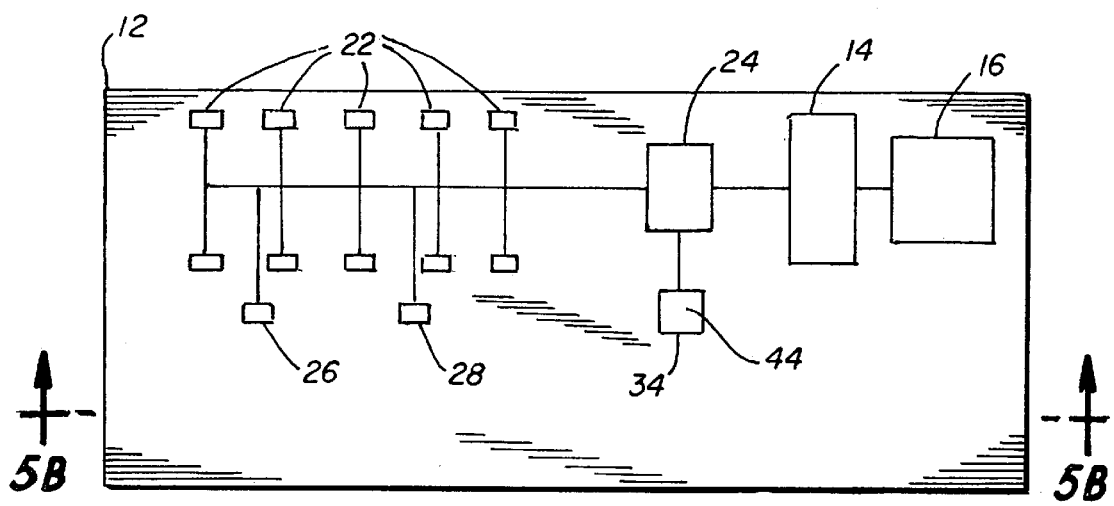
FIG. 5a is a schematic illustration of an embodiment of the present invention.
Figure 5B:
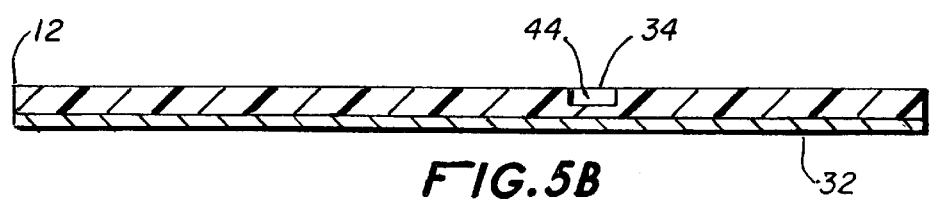

Referring now to FIGS. 5a and 5b, a fourth embodiment of transaction card 12 is provided. Solar cell 16 and thin battery 14 provide a power source which extends power to enter key 26, numeric keypad 22, cancel key 28, electrical microprocessor 24, and liquid crystal display 34. After enter key 26 is pressed, microprocessor 24 is ready to receive a card activation number and a transaction access code from numeric keypad 22. After a card activation number is entered by pressing the correct sequence, followed by the transaction access code on numeric keypad 22, the microprocessor 24 receives the number and activates liquid crystal display 34. Microprocessor 24 has been previously programmed by the card issuer at the time of manufacture of the card 12 to display transaction approval code symbol 44 on the liquid crystal display 34. The transaction approval code symbol 44 is preferably a letter or number or combination thereof which corresponds to a transaction access code entered after the card activation number has been entered. Upon completion of point of sale transaction the cardholder deactivates the liquid crystal display by pressing the cancel key 28. Symbol 44 is the sequential transaction approval code which corresponds to a specific transaction access code entered after the card activation number has been entered. This embodiment provides an additional measure of security and also eliminates the need for a timer which controls the sequential symbol 44. Security has been enhanced by the ability of the card to produce a symbol 44 (transaction approval code) which will only be used once during the lifetime of the card. This is achieved by programming the card issuers database to produce a specific symbol 44 for one transaction only and then to never recognize that specific symbol 44 for any future transactions. The transaction card 12 will not need a timer to control the symbol 44; it will only need the ability to recognize a card activation number (known only to the authorized cardholder) followed by a transaction access code which is provided by the card issuer's database to the salesclerk and cardholder at point-of-sale for each transaction. This will produce a corresponding symbol 44 (transaction approval code) which will be visible in the card's liquid crystal display 34. In this regard, chances of fraudulent use of a transaction card 12 for telephone orders would be substantially reduced since the same transaction approval code will never be used twice.

A practical example may be helpful to illustrate the use of this embodiment. The following are the three types of numbers necessary for this embodiment to work in practice:

|  | Type 1<br>Card Activation<br>Number (PIN) | Type 2<br>Transaction<br>Access Code | Type 3<br>Transaction<br>Approval Code |
| --- | --- | --- | --- |
| Transaction # | 0123 | | |
| 1 | | 4134 | P5 |
| 2 | | 8272 | J9 |
| 3 | | 6946 | L4 |

At the point-of-sale a cardholder presents his card to the store clerk before the card has been activated. The clerk will then either draw the card through a magnetic stripe reader or call in the card number to the card issuer. The card issuer will then provide to the sales clerk information regarding the card in much the same fashion as is currently common. However, with the present invention, in addition to cardholder account and name information the sales clerk is provided with a transaction access code and a corresponding symbol 44 (transaction approval code). The card is then handed back to the card holder who proceeds to activate the card by first pressing the enter key, and then pressing the correct card activation number, followed by the transaction access code which has been provided by the card issuer to the sales clerk who then provides this code to the card holder. The microprocessor in the transaction card has been preprogrammed to recognize the card activation number followed by a transaction access code which specifically corresponds to a sequential symbol (transaction approval code) which will then be visible on the liquid crystal display. So, for transaction #1 listed above, the sales clerk draws the transaction card through an existing card reading system and is provided with cardholder name, and account numbers along with transaction access code 4134 and corresponding transaction approval code P5. The card is then handed back to the cardholder who proceeds to activate the card by pressing the enter key, then card activation number 0123 (known only to the authorized cardholder) followed by transaction access code 4134. This will activate the card and transaction approval code P5 will be visible in the liquid crystal display area. The sequence of transaction approval codes (symbol 44) held in the card issuers database will then advance to the next transaction approval code, and will never again recognize P5 as a valid transaction approval code. The next time the card is used the transaction access code 8272 along with the corresponding transaction approval code J9 will be provided.

Numerous other modifications and changes of this transaction card are possible. An example of such modification would be: instead of a transducer capable of creating a magnetic field over the magnetic stripe, electrically conductive strips could be placed over and connected to the magnetic stripe which has a constant current flowing through them which renders the magnetic stripe unreadable. But when the card is activated by use of the card activation number, the current can be disrupted, thus making the magnetic stripe readable.

This invention has been described in detail with reference to a particular embodiment thereof, but it will be understood that various other modifications can be effected within the spirit and scope of this invention.

I claim:

1. A method for preventing transaction card fraud in card-purchase transactions involving a purchase by a cardholder from a seller using a card issued by a card issuer, comprising:

issuing a transaction card to the cardholder, along with a corresponding card activation number;

the card issuer providing a transaction access code and a corresponding transaction approval code to the seller at the time each transaction is initiated, said access code and said approval code being changed after each transaction;

providing a keypad and display means on said transaction card;

providing means for receiving and processing numbers or symbols entered into said keypad;

providing said transaction access code to the cardholder and requiring the cardholder to enter said transaction access code and said card activation number into said keypad;

said receiving and processing means being preprogrammed to respond to the cardholder entering the card activation number and transaction access code by providing a symbol to be displayed by said display means, said symbol necessarily being identical to said-transaction approval code provided by the issuer when the card transaction is valid; and verifying the authenticity of said card transaction by comparing said symbol to said transaction approval code.

* * * * *